US012810856B2

(12) United States Patent
Kamai et al.

(10) Patent No.: US 12,810,856 B2
(45) Date of Patent: Nov. 24, 2026

(54) VOICE RECOGNITION DEVICE, VOICE RECOGNITION METHOD, AND NON-TRANSITORY COMPUTER READABLE RECORDING MEDIUM

(71) Applicant: Panasonic Intellectual Property Corporation of America, Torrance, CA (US)

(72) Inventors: Takahiro Kamai, Kyoto (JP); Kousuke Itakura, Osaka (JP); Misaki Doi, Osaka (JP); Katsunori Daimo, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 252 days.

(21) Appl. No.: 18/517,229

(22) Filed: Nov. 22, 2023

(65) Prior Publication Data

US 2024/0087570 A1 Mar. 14, 2024

Related U.S. Application Data

(63) Continuation of application No. PCT/JP2022/018332, filed on Apr. 20, 2022.

(30) Foreign Application Priority Data

May 28, 2021 (JP) ................................ 2021-090331

(51) Int. Cl.

| | |
|---|---|
| ***G10L 15/10*** | (2006.01) |
| ***G10L 15/20*** | (2006.01) |
| ***G10L 15/22*** | (2006.01) |

(52) U.S. Cl.

CPC ........ *G10L 15/22* (2013.01); *G10L 2015/223* (2013.01)

(58) Field of Classification Search

None

See application file for complete search history.

(56) References Cited

U.S. PATENT DOCUMENTS

| | | | | |
|---|---|---|---|---|
| 12,412,580 | B2 * | 9/2025 | Kawaguchi | G10L 21/0272 |
| 2004/0138882 | A1 * | 7/2004 | Miyazawa | G10L 21/0208 704/E15.01 |

(Continued)

FOREIGN PATENT DOCUMENTS

| | | |
|---|---|---|
| JP | 2006106300 A * | 4/2006 |
| JP | 2008-070596 | 3/2008 |
| WO | 2015/029362 | 3/2015 |

OTHER PUBLICATIONS

Extended European Search Report (ESSR) dated Jun. 13, 2024 issued in European patent application No. 22811075.5.

(Continued)

*Primary Examiner* — Seong-Ah A Shin

(74) *Attorney, Agent, or Firm* — Greenblum & Bernstein, P.L.C.

(57) ABSTRACT

A voice recognition device includes: a calculation unit that calculates a first feature amount that is a feature amount of input voice data acquired by a first acquisition unit; an estimation unit that estimates a driving situation of a mobile object on the basis of operation information acquired by a second acquisition unit; an extraction unit that extracts, from a feature amount database, a second feature amount corresponding to the driving situation; a recognition unit that recognizes an input command on the basis of similarity between the first feature amount and the second feature amount; and an output unit that outputs a recognition result.

8 Claims, 10 Drawing Sheets

(56) References Cited

U.S. PATENT DOCUMENTS

| | | | | |
|---|---|---|---|---|
| 2004/0215454 | A1* | 10/2004 | Kobayashi | G10L 15/20 704/239 |
| 2005/0228669 | A1* | 10/2005 | Bernard | G10L 15/20 704/256 |
| 2007/0288242 | A1* | 12/2007 | Spengler | G10L 15/20 704/E15.04 |
| 2008/0071535 | A1 | 3/2008 | Yoshioka et al. | |
| 2008/0071536 | A1* | 3/2008 | Nagashima | G10L 15/32 704/E15.001 |
| 2008/0298599 | A1* | 12/2008 | Kim | H04R 29/004 704/E19.002 |
| 2014/0138882 | A1 | 5/2014 | Castilone et al. | |
| 2015/0106088 | A1* | 4/2015 | Jarvinen | G10L 21/0208 704/233 |
| 2015/0287414 | A1* | 10/2015 | Tsujikawa | G10L 17/22 704/275 |
| 2016/0019887 | A1* | 1/2016 | Kim | G10L 15/183 704/246 |
| 2020/0160871 | A1* | 5/2020 | Wada | G10L 25/90 |
| 2021/0287661 | A1* | 9/2021 | Sharma | G10L 13/02 |
| 2025/0234126 | A1* | 7/2025 | Tateishi | H04R 1/326 |

OTHER PUBLICATIONS

International Search Report issued in International Pat. Appl. No. PCT/JP2022/018332, dated Jul. 26, 2022, along with an English translation thereof.

* cited by examiner

FIG.2

20

| SPEAKER ID | REGISTRATION COMMAND ID | DRIVING SITUATION | SECOND FEATURE AMOUNT |
|---|---|---|---|
| U1 | C1 | SLOW DRIVING | |
| U1 | C1 | CITY DRIVING | |
| U1 | C1 | HIGH SPEED DRIVING | |
| U1 | C2 | SLOW DRIVING | |
| U1 | C2 | CITY DRIVING | |
| U1 | C2 | HIGH SPEED DRIVING | |
| ... | ... | ... | |

VOICE RECOGNITION DEVICE, VOICE RECOGNITION METHOD, AND NON-TRANSITORY COMPUTER READABLE RECORDING MEDIUM

TECHNICAL FIELD

The present disclosure relates to a technique for performing voice recognition on a command of an apparatus.

BACKGROUND ART

There is known a technique of identifying the user who utters a command voice by registering the user's voice in advance. Patent Literature 1 discloses a technique of correcting a distance between feature amounts of registered voice registered in advance and authentication voice collected from a person to be authenticated based on a correction value set according to a characteristic of noise at the time of authentication generated around the person to be authenticated at the time of authentication, and determining validity of the person to be authenticated by comparing the corrected distance with a predetermined threshold.

However, the above-described prior art needs further improvement in order to accurately recognize an input command uttered by a speaker.

CITATION LIST

Patent Literature

Patent Literature 1: JP 2008-70596 A
Patent Literature 2: WO 2015/029362 A

SUMMARY OF INVENTION

The present disclosure has been made to solve such a problem, and an object of the present disclosure is to provide a technique capable of more accurately recognizing an input command uttered by a speaker.

A voice recognition device according to one aspect of the present disclosure is a voice recognition device that recognizes a command of an apparatus by voice, the voice recognition device including a first acquisition unit that acquires input voice data of an input command uttered by a speaker, a calculation unit that calculates a first feature amount that is a feature amount of the input voice data, a second acquisition unit that acquires operation information of the apparatus, an estimation unit that estimates a driving situation of the apparatus based on the acquired operation information, a feature amount database that stores a plurality of second feature amounts that are feature amounts of superimposed registered voice data in which noise data indicating a noise sound of the apparatus according to a plurality of driving situations is superimposed on each piece of registered voice data of a plurality of registration commands uttered by the speaker in advance, an extraction unit that extracts one or more second feature amounts corresponding to the estimated driving situation from the feature amount database, a recognition unit that recognizes the input command based on similarity between the first feature amount and the one or more extracted second feature amounts, and an output unit that outputs a recognition result.

According to the present disclosure, it is possible to more accurately recognize an input command uttered by a speaker.

BRIEF DESCRIPTION OF DRAWINGS

FIG. 2 is a diagram illustrating an example of a data configuration of a feature amount database.

DESCRIPTION OF EMBODIMENTS (Knowledge Underlying Present Disclosure)

Figure 10:
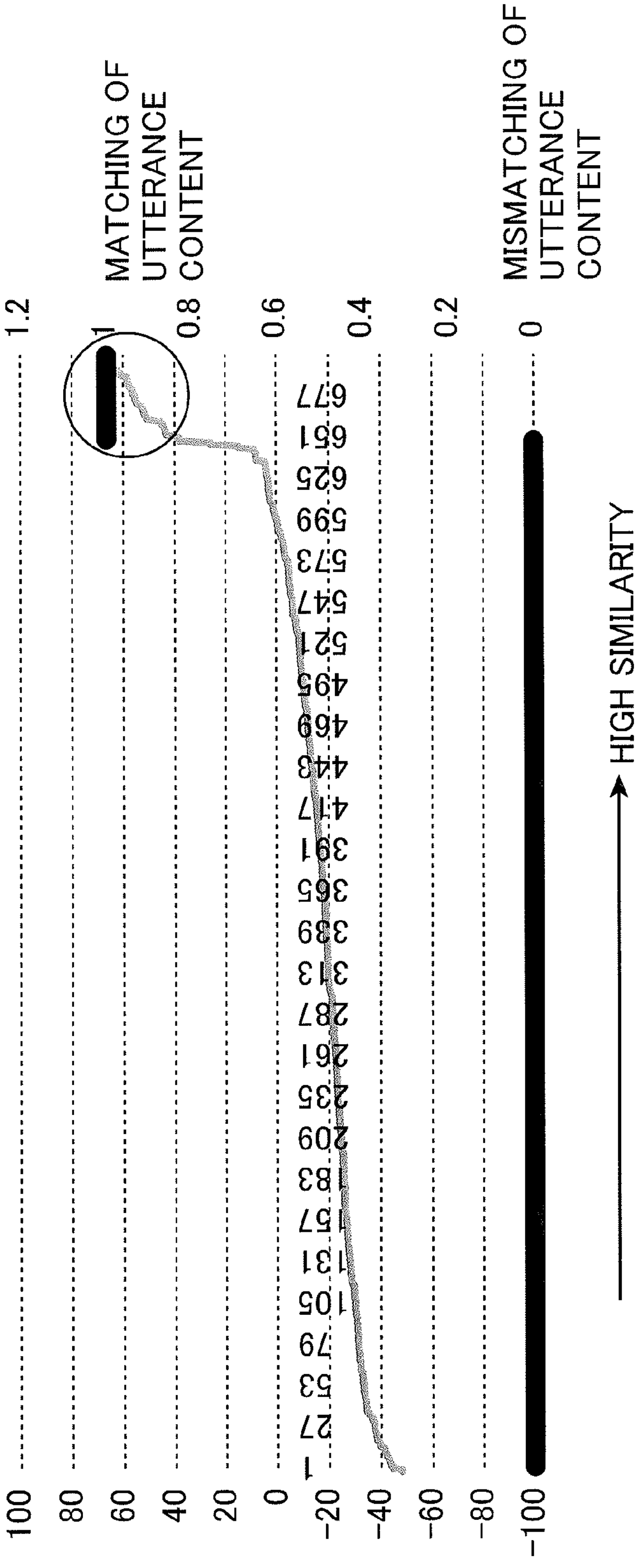
FIG. 10 is a graph illustrating an experiment result of similarity according to utterance content.

There is known a speaker identification technique that acquires voice data uttered by a target speaker to be identified and compares a feature amount of the acquired voice data with a feature amount of voice data of each of a plurality of registered speakers to identify which of a plurality of the registered speakers the target speaker corresponds to. Such a speaker identification technique is to identify whether or not speakers are the same based on similarity obtained by comparing feature amounts. Here, the similarity is calculated so as to indicate a high value when speakers are the same and indicate a low value when speakers are not the same regardless of utterance content. That is, it is ideal that similarity does not depend on utterance content, but it has been found that similarity decreases when utterance content is different even if speakers are actually the same. FIG. 10 is a graph illustrating an experiment result of similarity according to utterance content. Thin lines in FIG. 10 are obtained by arranging, in ascending order, similarities calculated based on 1920 combinations of utterance, excluding the same utterance, of a certain speaker uttering 15 kinds of sentences three times or two times. Further, a thick line in FIG. 10 indicates data indicating matching or mismatching of utterance content. According to FIG. 10, it has been found that, between utterances by the same speaker, similarity is high in a case where utterance content matches, but similarity significantly decreases in a case where utterance content does not match.

On the other hand, by using this decrease in similarity, a command for an apparatus uttered by the same speaker can be recognized. For example, when feature amounts of a plurality of registration commands uttered by a target speaker are registered in advance, a feature amount of an input command uttered by the target speaker is compared with each of feature amounts of a plurality of registration commands, and a registration command having a highest similarity is determined as an input command, the input command can be recognized.

However, in an apparatus such as a mobile object, surrounding noise sounds are different depending on driving situations such as at the time of traveling and at the time of stop. Therefore, in a case where a driving situation is different between at the time of registration and at the time of utterance such that feature amounts of a plurality of registration commands are registered at the time of stop and an input command is uttered at the time of traveling, only a low value of similarity can be obtained, and an input command cannot be recognized with high accuracy.

Patent Literature 1 is a technique for determining validity of a person to be authenticated and is not a technique for recognizing a command, and thus cannot recognize an input command uttered by a speaker.

In Patent Literature 2, an environmental sound corresponding to a driving situation of a plurality of apparatuses is removed as noise from a voice command from the user. In this case, there is a high possibility of removal of target voice data, and as a result of distortion occurring in target voice data, a voice command cannot be recognized with high accuracy.

The present disclosure has been made based on these findings, and an object of the present disclosure is to provide a technique capable of more accurately recognizing an input command uttered by a speaker.

A voice recognition device according to one aspect of the present disclosure is a voice recognition device that recognizes a command of an apparatus by voice, the voice recognition device including a first acquisition unit that acquires input voice data of an input command uttered by a speaker, a calculation unit that calculates a first feature amount that is a feature amount of the input voice data, a second acquisition unit that acquires operation information of the apparatus, an estimation unit that estimates a driving situation of the apparatus based on the acquired operation information, a feature amount database that stores a plurality of second feature amounts that are feature amounts of superimposed registered voice data in which noise data indicating a noise sound of the apparatus according to a plurality of driving situations is superimposed on each piece of registered voice data of a plurality of registration commands uttered by the speaker in advance, an extraction unit that extracts one or more second feature amounts corresponding to the estimated driving situation from the feature amount database, a recognition unit that recognizes the input command based on similarity between the first feature amount and the one or more extracted second feature amounts, and an output unit that outputs a recognition result.

According to this configuration, a driving situation of an apparatus is estimated from operation information of the apparatus, a second feature amount corresponding to the estimated driving situation is acquired from the feature amount database, and an input command is recognized on the basis of similarity between the acquired second feature amount and the first feature amount of input voice data of an input command uttered by a speaker. The second feature amount is a feature amount of voice data in which noise data according to a driving situation is superimposed on each piece of registered voice data of a plurality of commands uttered by a speaker at the time of registration of a command. For this reason, from among a plurality of the second feature amounts stored in the feature amount database, it is possible to extract the second feature amount which is a feature amount of superimposed registered voice data in which noise data similar to noise data according to a driving situation of an apparatus when an input command is uttered is superimposed on registered voice data, and calculate similarity between the extracted second feature amount and the first feature amount. As a result, an input command can be recognized more accurately.

In the voice recognition device, the apparatus may be a mobile object, and the operation information may include traveling noise data indicating a noise sound during traveling of the mobile object.

According to this configuration, since a driving situation of a mobile object is estimated based on traveling noise data indicating a noise sound when the mobile object travels, the driving situation of the mobile object can be accurately estimated.

In the voice recognition device, the apparatus may be a mobile object, and the operation information may include travel data detected by a sensor of the mobile object.

According to this configuration, since a driving situation of a mobile object is estimated based on travel data detected by the sensor of the mobile object, it is possible to acquire the travel data by use of an existing sensor of the mobile object without separately providing a sensor, and accurately estimate a driving situation of the mobile object.

In the voice recognition device, the operation information may further include environment data indicating an environment around the mobile object.

According to this configuration, since the driving situation of the mobile object is estimated using the environment data in addition to the travel data, the driving situation of the mobile object can be estimated more accurately.

In the above voice recognition device, the apparatus may be a mobile object, and the driving situation may include at least one of situations of slow driving, city driving, and high speed driving.

According to this configuration, it is possible to more accurately recognize an input command in consideration of a difference in noise data corresponding to slow driving, city driving, and high speed driving.

In the voice recognition device, the estimation unit may use a trained model obtained by machine learning using the operation information and a driving situation according to the operation information as learning data to estimate the driving situation.

According to this configuration, since a trained model obtained by machine learning using operation information and a driving situation according to the operation information as learning data is used to estimate the driving situation, it is possible to accurately estimate the driving situation corresponding to an operation state.

In the voice recognition device, noise data superimposed on the registered voice data may be generated by a noise generator that generates the noise data according to the driving situation.

According to this configuration, since noise data according to a driving situation is generated by the noise generator, noise data to be superimposed on registered voice data can be easily generated, and the feature amount database can be easily constructed.

In the voice recognition device, the recognition unit may recognize, as the input command, a registration command corresponding to a second feature amount having highest similarity to the first feature amount among the one or more extracted second feature amounts.

According to this configuration, since a registration command having highest similarity to a first feature amount among extracted second feature amounts is recognized as an input command, the input command can be recognized more accurately.

In the voice recognition device, the first feature amount and the second feature amount may be vectors, and the similarity may be calculated based on a distance between vectors of the first feature amount and the extracted one or more second feature amounts.

According to this configuration, since similarity is calculated based on a distance between vectors of a first feature amount and a second feature amount, the similarity can be calculated with high accuracy.

A voice recognition method according to another aspect of the present disclosure is a voice recognition method in a voice recognition device that recognizes a command of an apparatus by voice, the voice recognition method including acquiring input voice data of an input command uttered by a speaker, calculating a first feature amount that is a feature amount of the input voice data, acquiring operation information of the apparatus, estimating a driving situation of the apparatus based on the acquired operation information, extracting one or more second feature amounts corresponding to the estimated driving situation from a feature amount database, the feature amount database storing a plurality of second feature amounts that are feature amounts of superimposed registered voice data in which noise data indicating a noise sound of the apparatus according to a plurality of driving situations is superimposed on each piece of registered voice data of a plurality of registration commands uttered by the speaker in advance, recognizing the input command based on similarity between the first feature amount and the one or more extracted second feature amounts, and outputting a recognition result.

According to this configuration, it is possible to obtain a voice recognition method that exhibits the same function and effect as those of the voice recognition device described above.

A voice recognition program according to still another aspect of the present disclosure is a voice recognition program for causing a computer to function as a voice recognition device that recognizes a command of an apparatus by voice, the voice recognition program causing a processor of the voice recognition device to execute processing of acquiring input voice data of an input command uttered by a speaker, calculating a first feature amount that is a feature amount of the input voice data, acquiring operation information of the apparatus, estimating a driving situation of the apparatus based on the acquired operation information, extracting one or more second feature amounts corresponding to the estimated driving situation from a feature amount database, the feature amount database storing a plurality of second feature amounts that are feature amounts of superimposed registered voice data in which noise data indicating a noise sound of the apparatus according to a plurality of driving situations is superimposed on each piece of registered voice data of a plurality of registration commands uttered by the speaker in advance, recognizing the input command based on similarity between the first feature amount and the one or more extracted second feature amounts, and outputting a recognition result.

According to this configuration, it is possible to obtain a voice recognition program that exhibits the same function and effect as those of the voice recognition device described above.

It is needless to say that the present disclosure allows such a voice recognition program to be distributed using a computer-readable non-transitory recording medium such as a CD-ROM, or via a communication network such as the Internet.

Each of embodiments to be described below illustrates a specific example of the present disclosure. Numerical values, shapes, constituents, steps, order of steps, and the like shown in the embodiments below are merely examples, and are not intended to limit the present disclosure. Further, among constituents in the embodiments below, a constituent that is not described in an independent claim indicating the most significant concept will be described as an optional constituent. Further, in all the embodiments, content of each of the embodiments can be combined.

First Embodiment

Figure 1:
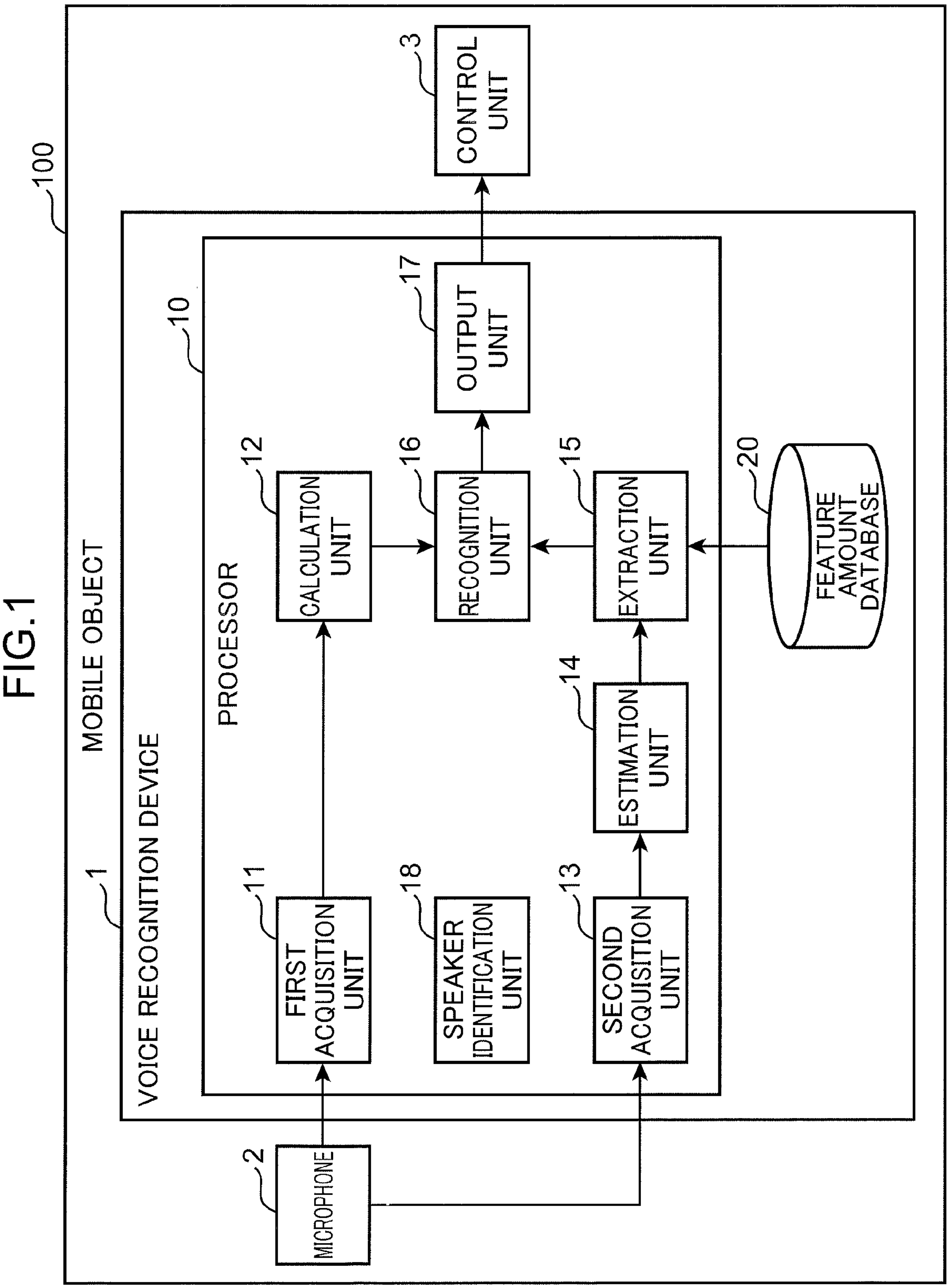
FIG. 1 is a block diagram illustrating an example of a configuration of a mobile object on which a voice recognition device according to a first embodiment of the present disclosure is mounted.

FIG. 1 is a block diagram illustrating an example of a configuration of a mobile object 100 on which a voice recognition device 1 according to a first embodiment of the present disclosure is mounted. The mobile object 100 includes a voice recognition device 1, a microphone 2, and a control unit 3. The mobile object 100 is, for example, a gasoline automobile, an electric automobile, an electric motorcycle, an electric bicycle, an electric kick scooter, or the like. Note that the mobile object 100 is an example, and the voice recognition device 1 may be mounted on an apparatus other than the mobile object 100. An apparatus other than a mobile object may be, for example, a household electric appliance such as an air conditioner or a washing machine, or may be a manufacturing device used in a manufacturing line. That is, for an apparatus on which the voice recognition device 1 is mounted, any apparatus may be employed as long as the apparatus is operated by an input command. The mobile object 100 may be a flying object such as an airplane. The manufacturing line may be a food manufacturing line for manufacturing a food product.

The voice recognition device 1 includes a processor 10 and a feature amount database 20. The processor 10 is, for example, a central processing unit. The processor 10 includes a first acquisition unit 11, a calculation unit 12, a second acquisition unit 13, an estimation unit 14, an extraction unit 15, a recognition unit 16, and an output unit 17. The first acquisition unit 11 to the output unit 17 are realized by the processor 10 executing a voice recognition program. However, this is an example, and the first acquisition unit 11 to the output unit 17 may be configured by a dedicated semiconductor circuit such as ASIC.

The first acquisition unit 11 detects a voice section from a sound signal input from the microphone 2, and acquires a sound signal of the detected voice section as input voice data. An input command is a command for controlling the mobile object 100. For example, an input command may be a command for setting a destination to a car navigation system, a command for switching a display screen of a car navigation system to heading up or north up, a command for operating a drive system of the mobile object 100 such as an engine and an accelerator, or a command for operating various pieces of equipment of the mobile object 100 such as an air conditioner, a wiper, a window, and a door. Input voice data is digital voice data.

The calculation unit 12 calculates a feature amount of input voice data. The feature amount is a feature amount suitable for voice recognition such as an i vector, an x vector, and a d vector.

The second acquisition unit 13 identifies a silent section adjacent to an utterance section from a sound signal acquired from the microphone 2, and acquires voice data of the identified silent section as traveling noise data indicating a noise sound during traveling of the mobile object 100. The traveling noise data is data indicating an environmental sound acquired by the microphone 2 under a situation where a speaker is not uttering. The traveling noise data is an example of operation information of an apparatus.

The estimation unit 14 estimates a driving situation of the mobile object 100 based on the traveling noise data input from the second acquisition unit 13. The estimation unit 14 preferably estimates a driving situation by using a trained model obtained by machine learning using the traveling noise data and a driving situation of the mobile object 100 when the traveling noise data is acquired as learning data. Generation of the trained model will be described later. The driving situation is data indicating a traveling situation of the mobile object 100. In description below, the driving situation is assumed to be three traveling situations of slow driving, city driving, and high speed driving. However, this is an example, and the driving situation may include, for example, a traveling situation such as an idle state, backward movement, and turning. Furthermore, at least two of the listed traveling situations may be employed as the driving situations.

The extraction unit 15 extracts a second feature amount corresponding to the driving situation estimated by the estimation unit 14 from the feature amount database 20. FIG. 2 is a diagram illustrating an example of a data configuration of the feature amount database 20. The feature amount database 20 is a database that stores a second feature amount that is a feature amount of superimposed registered voice data in which noise data indicating a noise sound of the mobile object 100 according to a plurality of driving situations is superimposed on each piece of registered voice data of a plurality of registration commands uttered by a speaker in advance. Specifically, the feature amount database 20 is a database that stores one feature amount data set in one record. In a feature amount data set, a speaker ID, a registration command ID, a driving situation, and a second feature amount are stored in association with each other.

The speaker ID is an identifier that uniquely identifies a speaker who gets on the mobile object 100. The registration command ID is an identifier that uniquely identifies a registration command. The registration command is a command of the mobile object 100 and is a predetermined command to be a recognition candidate. The driving situation is a driving situation corresponding to noise data superimposed on registered voice data. The second feature amount is a feature amount of superimposed registered voice data in which noise data is superimposed on voice registration data. The same feature amount as the first feature amount is employed as the second feature amount, and is, for example, an i vector, an x vector, a d vector, or the like. The registered voice data is, for example, voice data acquired through registration work in which a speaker is caused to utter registration commands one by one. This registration work is performed, for example, at the time of stoppage of the mobile object 100 immediately after purchase of the mobile object 100. The time of stoppage refers to a state in which power is supplied from a battery of the mobile object 100 to at least the voice recognition device 1, but the mobile object 100 is not traveling. The registration work will be described later.

The reference is made to FIG. 1 again. The recognition unit 16 recognizes an input command on the basis of similarity between the first feature amount calculated by the calculation unit 12 and the second feature amount extracted by the extraction unit 15. For example, the recognition unit 16 preferably recognizes a registration command having a highest similarity between the first feature amount and the second feature amount as an input command. As the similarity, a reciprocal of a distance between the first feature amount and the second feature amount can be employed. As the distance, for example, a Euclidean distance can be employed.

The output unit 17 outputs a recognition result recognized by the recognition unit 16. The recognition result includes a registration command ID indicating a registration command recognized as an input command among registration commands. The output unit 17 inputs the recognition result to the control unit 3.

A speaker identification unit 18 identifies a speaker who utters an input command. For example, the speaker identification unit 18 preferably acquires a speaker ID registered in advance in a key of the mobile object 100 using a proximity wireless communication device (not illustrated) included in the mobile object 100, and identifies a speaker who utters an input command from the acquired speaker ID. Alternatively, the speaker identification unit 18 may sequentially compare the first feature amount calculated by the calculation unit 12 with registered feature amounts that are feature amounts of voice of one or more registered speakers registered in advance, and identify a speaker having a registered feature amount in which similarity between the first feature amount and the registered feature amount is highest as a speaker who utters an input command.

The microphone 2 collects a sound such as voice uttered by the user in a mobile object, converts the collected sound into a sound signal, performs A/D conversion on the converted sound signal, and inputs the A/D converted sound signal to the first acquisition unit 11 and the second acquisition unit 13.

The control unit 3 includes, for example, a central processing unit, and performs overall control of the mobile object 100. The control unit 3 executes a command indicated by the recognition result input from the output unit 17. By the above, a speaker can operate the mobile object 100 by uttering a command.

Figure 3:
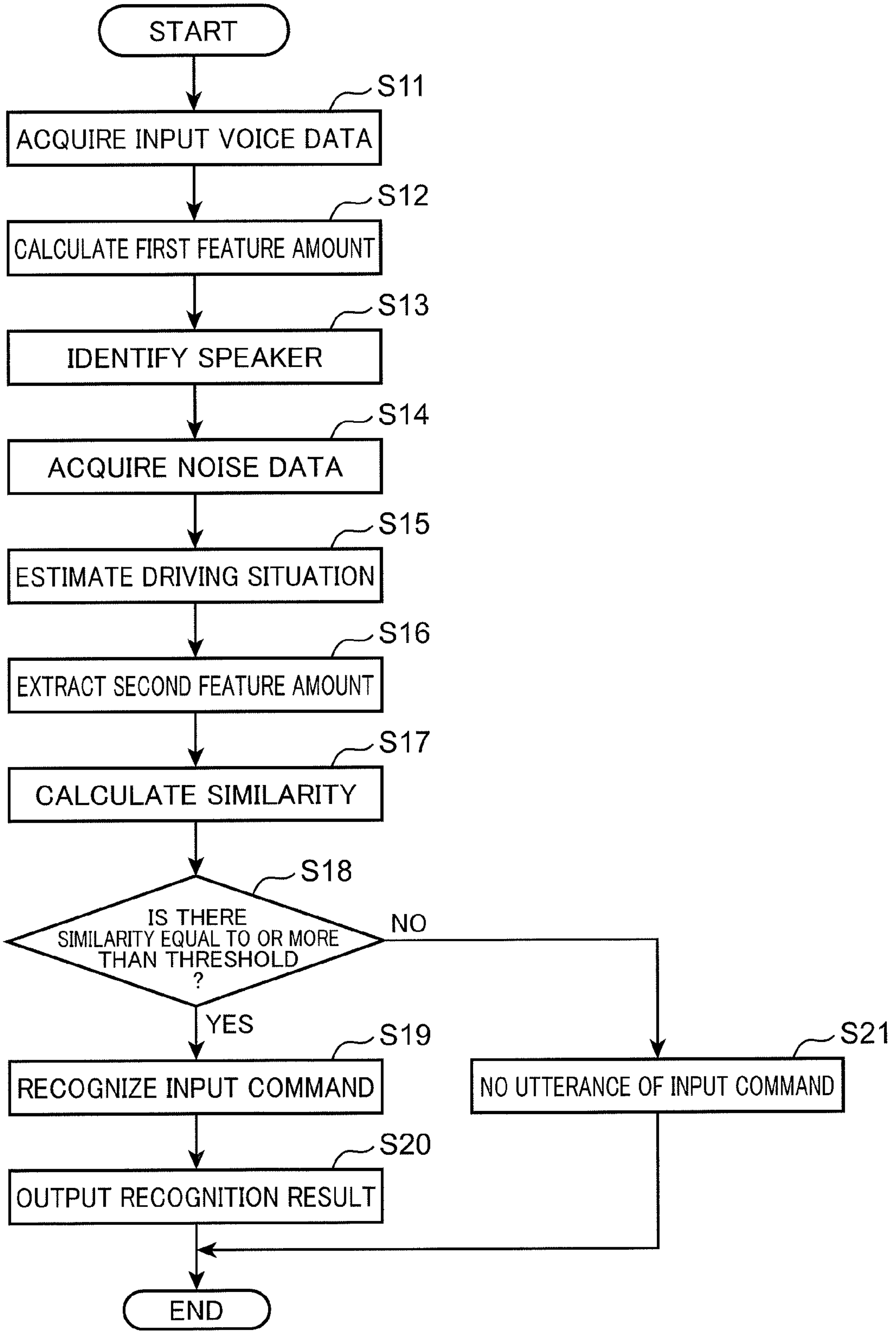
FIG. 3 is a flowchart illustrating an example of processing of the voice recognition device according to the first embodiment.

FIG. 3 is a flowchart illustrating an example of processing of the voice recognition device 1 according to the first embodiment. In Step S11, the first acquisition unit 11 acquires input voice data from a sound signal input from the microphone 2. In Step S12, the calculation unit 12 calculates the first feature amount of the input voice data. In Step S13, the speaker identification unit 18 identifies a speaker who utters an input command by calculating similarity between the first feature amount and a registered feature amount of a registered speaker.

In Step S14, the second acquisition unit 13 acquires traveling noise data from the sound signal input from the microphone 2. In Step S15, the estimation unit 14 estimates a driving situation by inputting the traveling noise data estimated in Step S14 to a trained model.

In Step S16, the extraction unit 15 extracts, from the feature amount database 20, the second feature amounts corresponding to the speaker identified in Step S13 and the driving situation estimated in Step S15. Referring to FIG. 2, in a case where a speaker ID of an identified speaker is "U1" and a driving situation is "slow driving", n second feature amounts corresponding to n registration commands "C1", "C2", . . . , and "Cn" with the speaker ID of "U1" and the driving situation of "slow driving" are extracted from the feature amount database 20. Here, n is an index for identifying a registration command, and is an integer of 1 or more.

In Step S17, the recognition unit 16 calculates n similarities between the first feature amount calculated in Step S12 and the n second feature amounts extracted in Step S16.

In Step S18, the recognition unit 16 determines the presence or absence of similarity equal to or more than a threshold among the n similarities. In a case where it is determined that there is similarity equal to or more than the threshold (YES in Step S18), the recognition unit 16 recognizes a registration command corresponding to the second feature amount having a highest similarity as an input command (Step S19).

In Step S20, the output unit 17 inputs a recognition result of the recognized input command in Step S18 to the control unit 3.

On the other hand, in a case where it is determined that there is no similarity equal to or more than the threshold (NO in Step S18), the recognition unit 16 determines that no input command is uttered (Step S21), and the processing ends.

As described above, according to the present embodiment, a driving situation of the mobile object 100 is estimated from traveling noise data of the mobile object 100, the second feature amount corresponding to the estimated driving situation is acquired from the feature amount database 20, and an input command is recognized on the basis of similarity between the acquired second feature amount and the first feature amount of input voice data of an input command uttered by a speaker. The second feature amount is a feature amount of superimposed registered voice data in which noise data according to a driving situation is superimposed on each piece of registered voice data of a plurality of commands uttered by a speaker at the time of registration of a command. For this reason, from among a plurality of the second feature amounts stored in the feature amount database 20, it is possible to extract the second feature amount of superimposed registered voice data in which noise data similar to noise data according to a driving situation of the mobile object 100 when an input command is uttered is superimposed on registered voice data, and calculate similarity between the extracted second feature amount and the first feature amount. As a result, an input command can be recognized more accurately.

Second Embodiment

In a second embodiment, travel data of the mobile object 100 and environment data of the mobile object are employed as operation information. Note that, in the present embodiment, the same constituent as that in the first embodiment is denoted by the same reference numeral, and omitted from description.

Figure 4:
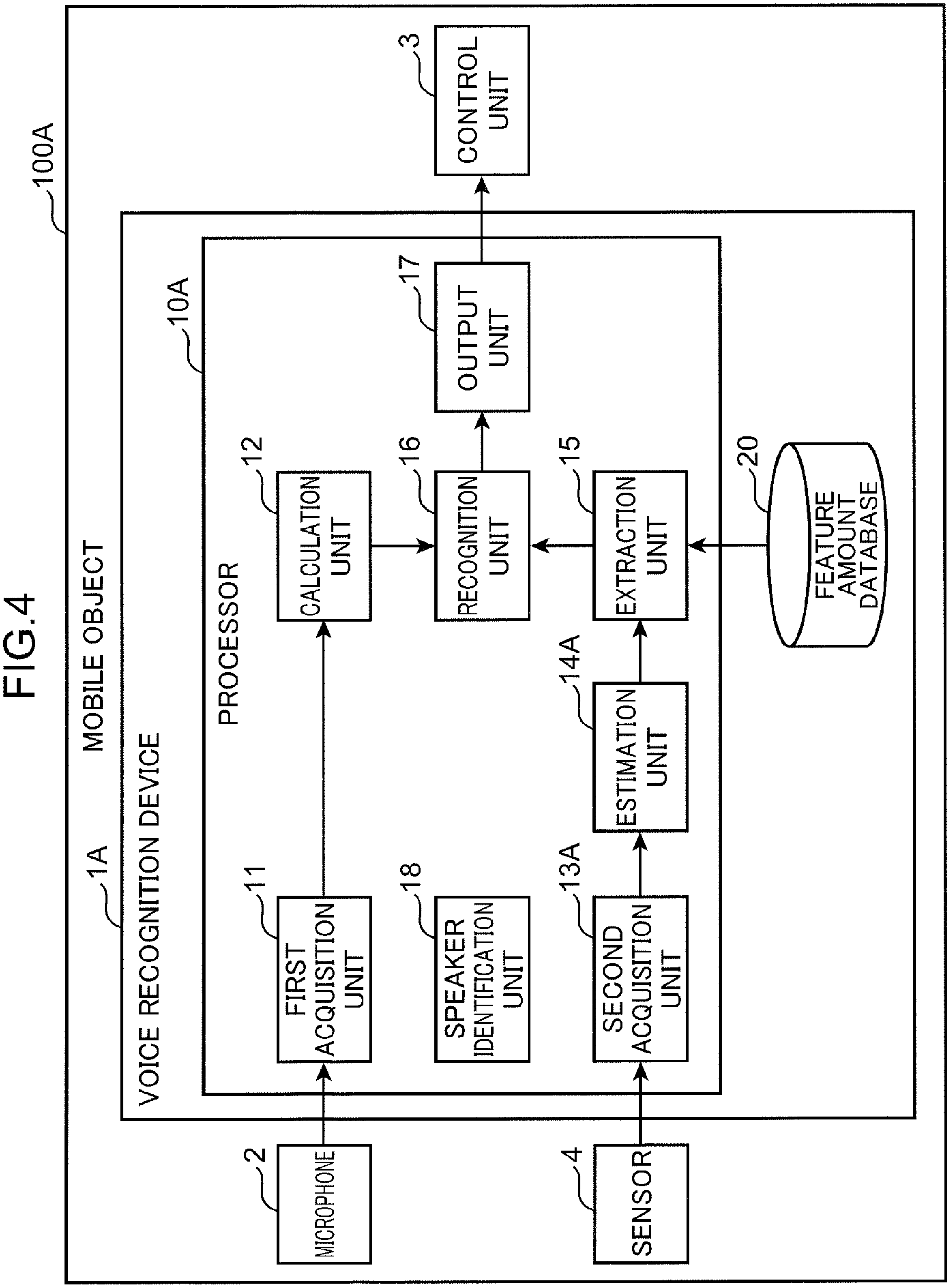
FIG. 4 is a block diagram illustrating an example of a configuration of a mobile object on which the voice recognition device according to a second embodiment of the present disclosure is mounted.

FIG. 4 is a block diagram illustrating an example of a configuration of a mobile object 100A on which a voice recognition device 1A according to the second embodiment of the present disclosure is mounted. The mobile object 100A further includes a sensor 4. The sensor 4 is a sensor that acquires travel data and environment data of the mobile object 100A.

The travel data is digital data that can be acquired from the sensor 4, and is, for example, data indicating a vehicle speed, a rotation speed of a power source such as an engine or a motor, on and off of a wiper, and an opening degree of a window of the mobile object 100A. For this reason, the sensor 4 includes a vehicle speed sensor, a rotation speed sensor, an operation switch of a wiper, and an opening and closing switch of a window.

The environment data is data indicating an environment around a mobile object, and is, for example, road surface data indicating a type of a road surface on which the mobile object 100A travels, weather data indicating weather, and temperature data indicating temperature. For this reason, the sensor 4 includes a road surface sensor for acquiring road surface data, a communication circuit for acquiring weather data indicating current weather around the mobile object 100A from an external server, and a temperature sensor for acquiring air temperature data indicating air temperature around the mobile object 100A. Note that the road surface sensor includes, for example, an acceleration sensor that detects vibration data of the mobile object 100A, and a signal processing circuit that determines a type of a road surface from the vibration data detected by the acceleration sensor and generates road surface data indicating a determination result. A type of a road surface is, for example, a paved road, an unpaved road, or the like.

A processor 10A of the voice recognition device 1A includes the first acquisition unit 11, the calculation unit 12, a second acquisition unit 13A, an estimation unit 14A, the extraction unit 15, the recognition unit 16, and the output unit 17.

The second acquisition unit 13A acquires travel data and environment data from the sensor 4.

The estimation unit 14A estimates a driving situation of the mobile object 100A based on the travel data and the environment data input from the second acquisition unit 13. The estimation unit 14A preferably estimates a driving situation using a trained model obtained by machine learning using the travel data and the environment data and a driving situation of the mobile object 100A when the travel data and the environment data are acquired as learning data. Generation of the trained model will be described later.

Figure 5:
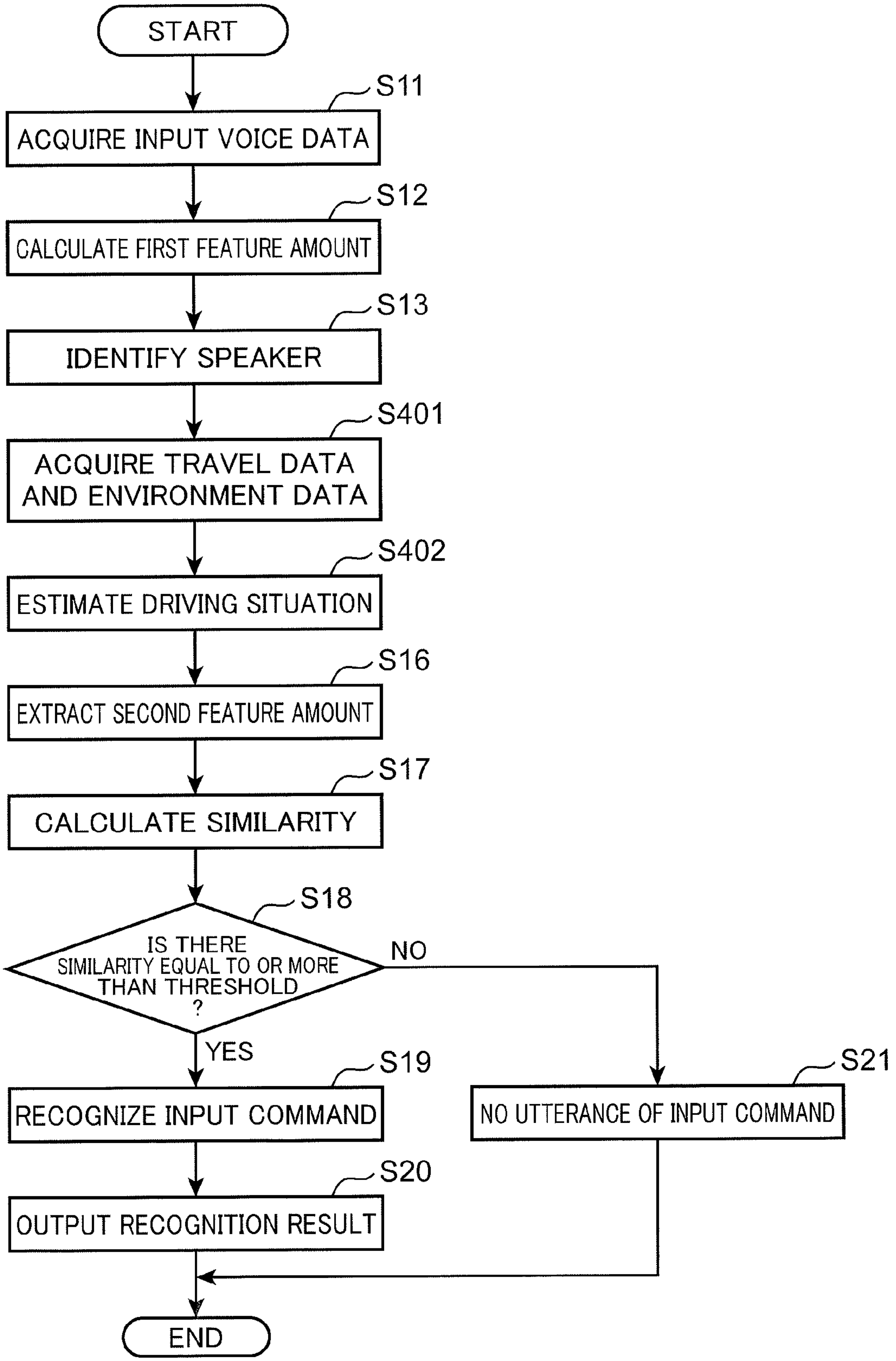
FIG. 5 is a flowchart illustrating an example of processing of the voice recognition device according to the second embodiment of the present disclosure.

FIG. 5 is a flowchart illustrating an example of processing of the voice recognition device 1A according to the second embodiment of the present disclosure. Note that, in FIG. 5, the same steps as those in FIG. 3 are denoted by the same reference numerals.

Processing from acquisition of input voice data to identification of a speaker (Steps S11 to S13) is the same as that in FIG. 3. In Step S401 subsequent to Step S13, the second acquisition unit 13A acquires travel data and environment data from the sensor 4.

In Step S402, the estimation unit 14A inputs the travel data and the environment data acquired in Step S401 to a trained model, and estimates a driving situation.

After the above, as in FIG. 3, processing in Steps S16 to S21 is executed, an input command is recognized, and a recognition result is output to the control unit 3.

As described above, according to the second embodiment, since a driving situation of the mobile object 100A is estimated based on travel data and environment data detected by the sensor 4, it is possible to acquire travel data and environment data using the existing sensor 4 of the mobile object 100A without separately providing a sensor, and it is possible to accurately estimate a driving situation of the mobile object 100A.

Third Embodiment

Figure 6:
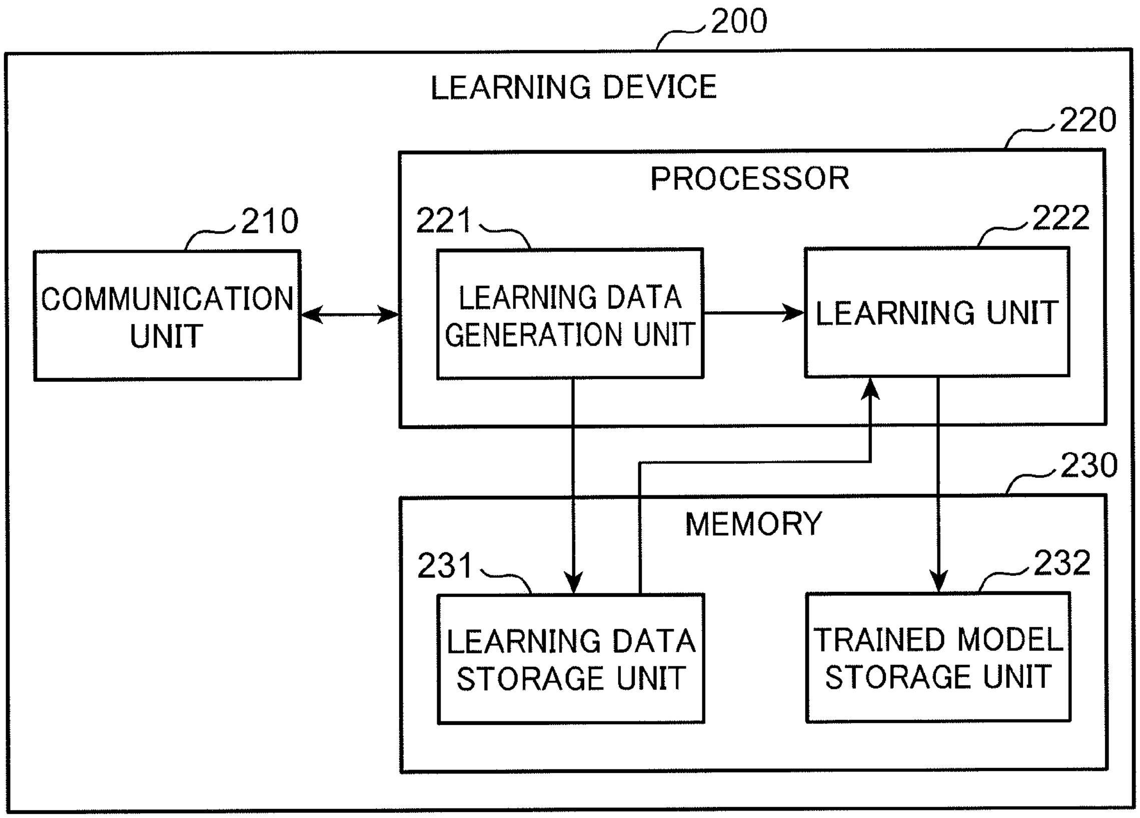
FIG. 6 is a block diagram illustrating an example of a configuration of a learning device in a third embodiment of the present disclosure.

A third embodiment relates to a learning device that generates a trained model. FIG. 6 is a block diagram illustrating an example of a configuration of a learning device 200 in the third embodiment of the present disclosure. The learning device 200 includes, for example, a cloud server. The learning device 200 is connected to the mobile objects 100 and 100A via a network such as the Internet.

The learning device 200 includes a communication unit 210, a processor 220, and a memory 230. The communication unit 210 is a communication circuit for connecting the learning device 200 to a network. The communication unit 210 receives, for example, log data periodically transmitted from the mobile objects 100 and 100A. In description below, the mobile objects 100 and 100A will be collectively referred to as the mobile object 100. The log data includes a time stamp indicating a transmission time of the log data, a mobile object ID indicating the mobile object 100 which is a transmission source of the log data, travel history data, and operation information corresponding to the travel history data. The travel history data is data necessary for identifying a driving situation, and includes, for example, a vehicle speed, position data of the mobile object 100, and the like. The operation information is noise data at the time of acquisition of the operation information in a case where the learning device 200 is applied to the first embodiment, and is travel data and environment data at the time of acquisition of the operation information in a case where the learning device 200 is applied to the second embodiment.

The processor 220 includes a learning data generation unit 221 and a learning unit 222. The learning data generation unit 221 determines a driving situation from travel history data, generates learning data in which the determined driving situation and operation information corresponding to the driving situation are associated with each other, and stores the generated learning data in a learning data storage unit 231. Here, for convenience of description, the driving situation includes three traveling situations of slow driving, city driving, and high speed driving as described above, but the present disclosure is not limited to this, and may include other traveling situations described above. For example, in a case where a vehicle speed included in travel history data is equal to or less than a predetermined vehicle speed indicating an upper limit vehicle speed of slow driving, the learning data generation unit 221 may determine that a driving situation is slow driving. Further, the learning data generation unit 221 collates position data of the mobile object 100 included in travel history data with map information, and may determine that a driving situation is city driving in a case where a position of the mobile object 100 is located in a predetermined region recognized as an urban area. Further, in a case where a vehicle speed included in travel history data is equal to or more than a predetermined lower limit vehicle speed indicating high speed driving, the learning data generation unit 221 may determine that a driving situation is high speed driving.

Note that, in a case where a driving situation includes an idle state, backward movement, and turning, the learning data generation unit 221 may calculate these driving situations as described below. In this case, travel history data includes, for example, backward movement data indicating that the mobile object 100 is moving backward and turning data indicating that the mobile object 100 is turning. In a case where travel history data includes data indicating an idle state, the learning data generation unit 221 may determine that the driving situation is the idle state. Further, the learning data generation unit 221 may determine that the driving situation is backward movement in a case where backward movement data is included in the travel history data. Further, in a case where the travel history data includes turning data, the learning data generation unit 221 may determine that the driving situation is turning.

When the number of pieces of data of learning data stored in the learning data storage unit 231 becomes equal to or more than a reference number of pieces of data, the learning unit 222 generates a trained model by performing machine learning using learning data stored in the learning data storage unit 231. An algorithm used for the machine learning is, for example, a neural network, a deep neural network, a random forest, a support vector machine, or the like, and is not particularly limited. The learning unit 222 generates a trained model by performing machine learning with operation information as input and a driving situation corresponding to the input operation information as teaching data. By the above, a trained model in which, when operation information is input, a driving situation corresponding to the operation information is output, is generated. Note that the trained model may be generated for each individual of the mobile object 100 or may be generated for each vehicle type of the mobile object 100, or a trained model common to all the mobile objects 100 may be generated.

The learning unit 222 stores the generated trained model in a trained model storage unit 232. Note that the learning unit 222 may update a trained model each time the number of pieces of learning data newly accumulated in the learning data storage unit 231 becomes equal to or more than a reference number of pieces of data.

The learning unit 222 transmits the generated trained model to the mobile object 100 using the communication unit 210. Note that the learning unit 222 may transmit an updated trained model to the mobile object 100 using the communication unit 210 every time a trained model is updated.

Figure 7:
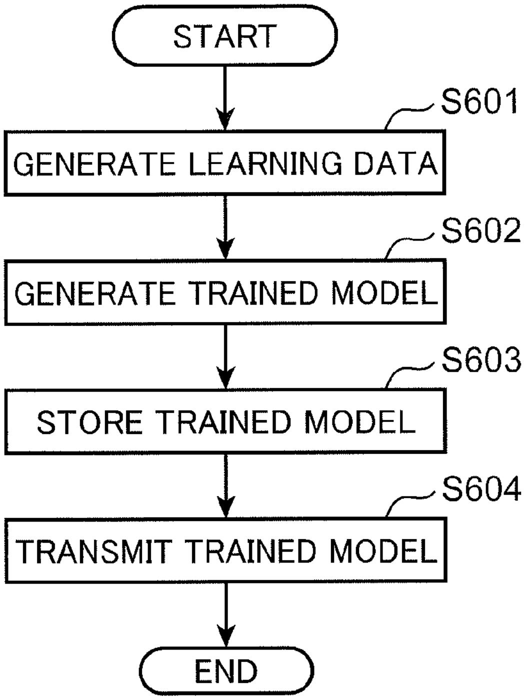
FIG. 7 is a flowchart illustrating an example of processing of the learning device.

FIG. 7 is a flowchart illustrating an example of processing of the learning device 200. In Step S601, the learning data generation unit 221 determines a driving situation using travel history data included in log data received by the communication unit 210, generates learning data including the determined driving situation and action history data corresponding to the driving situation, and stores the generated learning data in the learning data storage unit 231.

In Step S602, when the number of pieces of data of learning data stored in the learning data storage unit 231 becomes equal to or more than reference number of pieces of data, the learning unit 222 generates a trained model by performing machine learning using the learning data stored in the learning data storage unit 231.

In Step S603, the learning unit 222 stores the generated trained model in the trained model storage unit 232.

In Step S604, the learning unit 222 transmits the generated trained model to the mobile object 100 using the communication unit 210.

As described above, according to the third embodiment, a trained model to be used by the voice recognition devices 1 and 1A to estimate a driving situation from operation information can be generated by use of travel history data transmitted from the mobile object 100 as needed.

Fourth Embodiment

Figure 8:
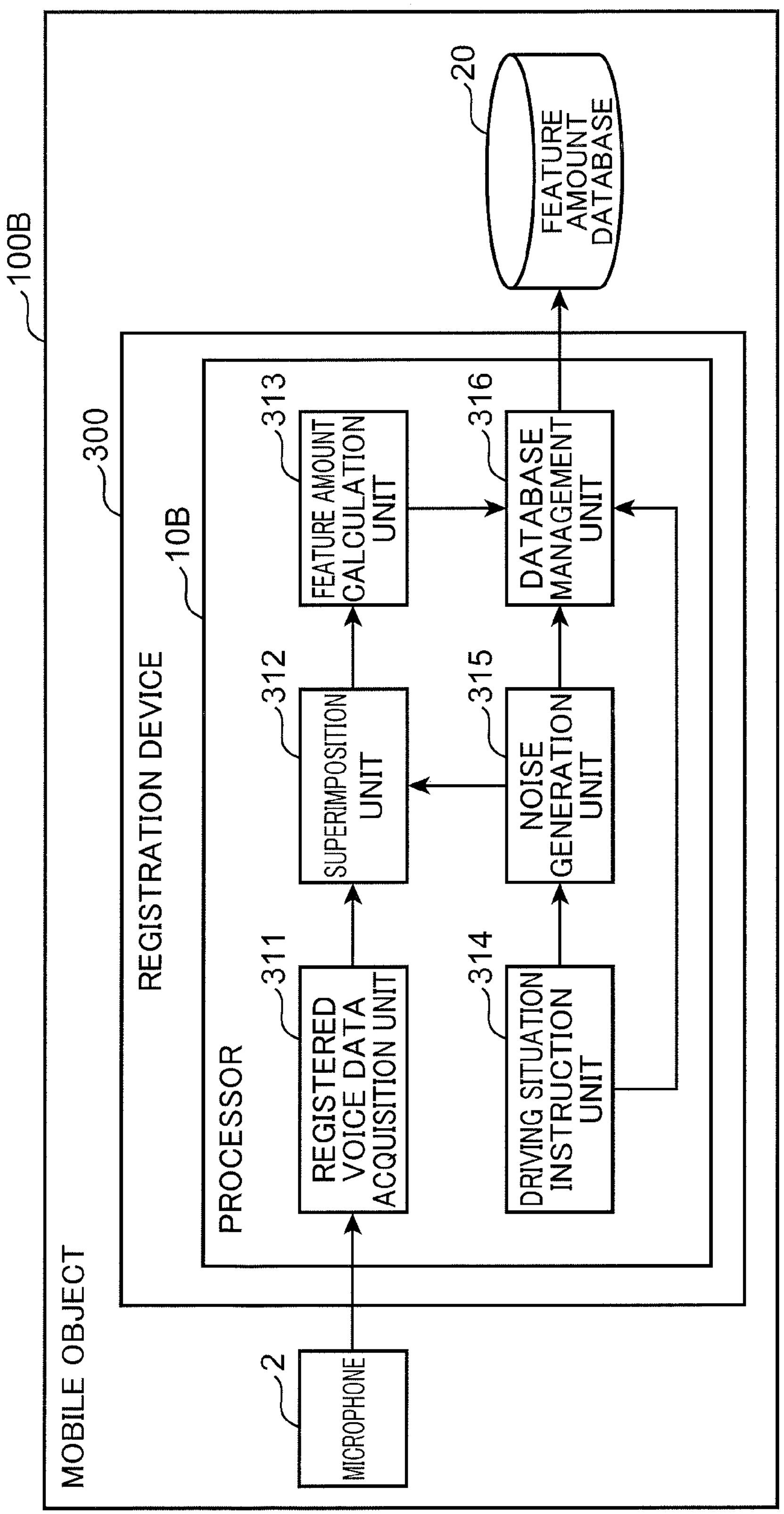
FIG. 8 is a block diagram illustrating an example of a configuration of a mobile object on which a registration device is mounted according to a fourth embodiment of the present disclosure.

A fourth embodiment relates to a registration device that registers registered voice data in the feature amount database 20. FIG. 8 is a block diagram illustrating an example of a configuration of a mobile object 100B on which a registration device 300 is mounted according to the fourth embodiment of the present disclosure. In the present embodiment, the same constituent as that in the first to third embodiments is denoted by the same reference numeral, and omitted from description. For example, the registration device 300 may be mounted on the same processors 10 and 10A as those in the mobile objects 100 and 100A on which the above-described voice recognition devices 1 and 1A are mounted, or may be mounted on a different processor.

The mobile object 100B includes the microphone 2, the registration device 300, and the feature amount database 20. The registration device 300 includes a processor 10B.

The processor 10B includes a registered voice data acquisition unit 311, a superimposition unit 312, a feature amount calculation unit 313, a driving situation instruction unit 314, a noise generation unit 315, and a database management unit 316.

The registered voice data acquisition unit 311 acquires registered voice data, which is voice data of a registration command uttered by a speaker in a registration mode, from a sound signal input from microphone 2, and inputs the acquired registered voice data to the superimposition unit 312. The registration mode is a mode for causing a speaker to perform registration work of causing a speaker to utter registration commands one by one. The registration device 300 preferably sets the registration mode in a case where a speaker inputs an instruction to execute the registration mode. The registered voice data acquisition unit 311 preferably acquires voice data input from a microphone in the registration mode as registered voice data. In the registration mode, a message prompting utterance is output in predetermined order to a display or a speaker (not illustrated) for each of a plurality of registration commands as recognition candidates. A speaker utters registration commands one by one according to this message. Further, in the registration mode, a speaker is caused to input a speaker ID prior to start of the registration work.

For this reason, the registered voice data acquisition unit 311 can grasp that a registration command currently uttered is which command uttered by which speaker. In view of the above, the registered voice data acquisition unit 311 preferably inputs a registration command ID for identifying a registration command and a speaker ID to the superimposition unit 312 in association with the acquired registered voice data.

When registered voice data for a certain registration command is acquired by the registered voice data acquisition unit 311, the driving situation instruction unit 314 inputs a driving situation to the noise generation unit 315. Here, the driving situation instruction unit 314 inputs a plurality of driving situations to the noise generation unit 315 and the database management unit 316 in predetermined order each time one piece of registered voice data is acquired by the registered voice data acquisition unit 311. For example, in a case where slow driving, city driving, and high speed driving are employed as driving situations, the driving situation instruction unit 314 sequentially inputs these three driving situations to the noise generation unit 315 and the database management unit 316 each time one piece of registered voice data is acquired by the registered voice data acquisition unit 311.

The noise generation unit 315 generates noise data corresponding to the input driving situation on the basis of the driving situation input from the driving situation instruction unit 314, and inputs the generated noise data to the superimposition unit 312. The noise generation unit 315 includes a noise table that stores noise data for each driving situation in advance. In view of the above, the noise generation unit 315 preferably acquires noise data corresponding to the input driving situation from the noise table and inputs the acquired noise data to the superimposition unit 312.

The superimposition unit 312 superimposes noise data input from the noise generation unit 315 on the registered voice data input from the registered voice data acquisition unit 311 to generate superimposed registered voice data, and inputs the superimposed registered voice data to the feature amount calculation unit 313. Note that the superimposition unit 312 preferably associates a speaker ID and a registration command ID associated with registered voice data of a superimposition source with the superimposed registered voice data and inputs them to the feature amount calculation unit 313.

The feature amount calculation unit 313 calculates a second feature amount that is a feature amount of superimposed registered voice data input from the superimposition unit 312, and inputs the calculated second feature amount to the database management unit 316. Note that the feature amount calculation unit 313 preferably associates a speaker ID and a registration command ID associated with the superimposed registered voice data with the calculated second feature amount and inputs them to the database management unit 316.

The database management unit 316 generates, in a second feature amount calculated by the feature amount calculation unit 313, a feature amount data set including a driving situation input from the driving situation instruction unit 314 and a speaker ID and a registration command ID associated with the second feature amount, and stores the generated feature amount data set in the feature amount database 20. As described above, the feature amount database 20 illustrated in FIG. 2 is constructed.

Figure 9:
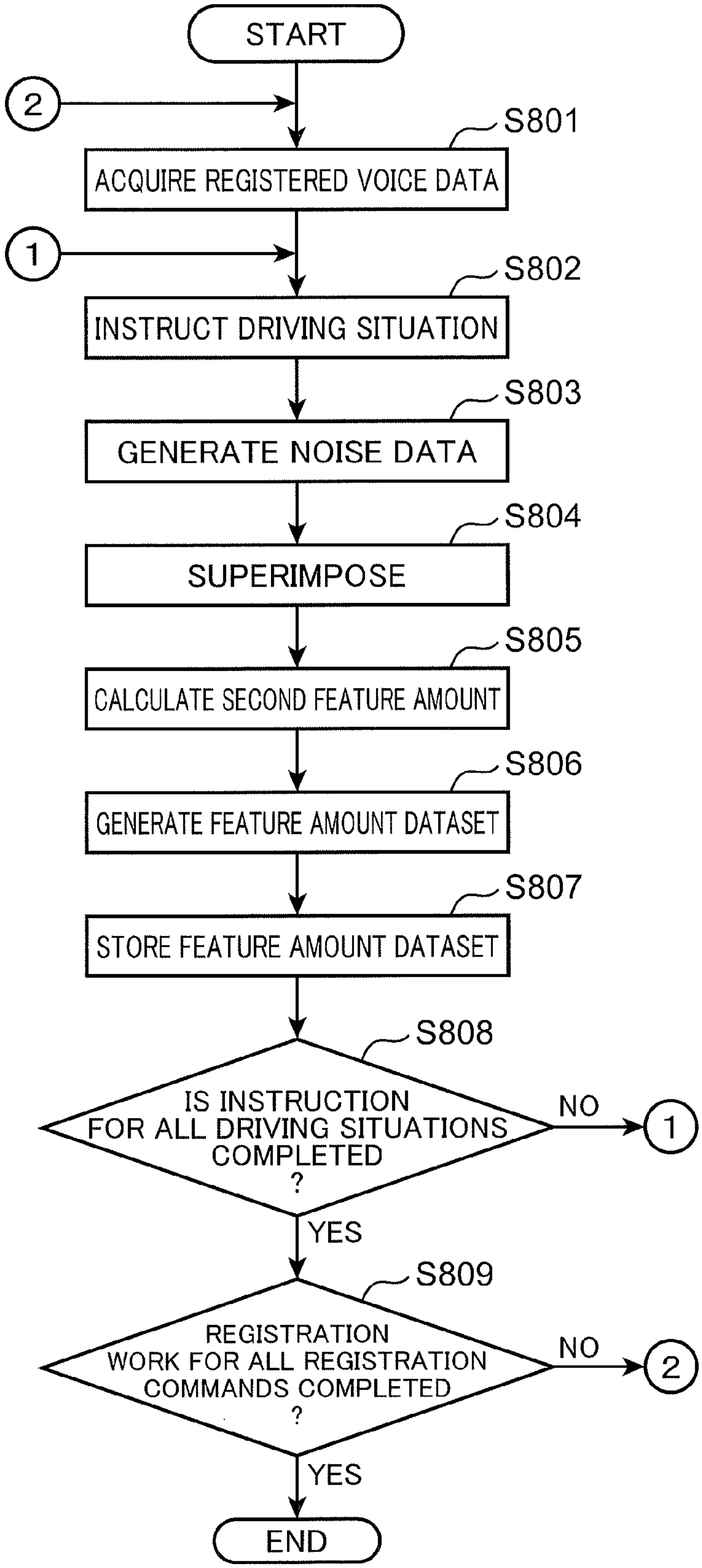
FIG. 9 is a flowchart illustrating an example of processing of the registration device.

FIG. 9 is a flowchart illustrating an example of processing of the registration device 300. Note that this flowchart is started in a case where a speaker inputs an instruction to execute the registration mode. In Step S801, the registered voice data acquisition unit 311 acquires registered voice data indicating voice uttered by a speaker for a certain registration command.

In Step S802, the driving situation instruction unit 314 instructs a driving situation to the noise generation unit 315 and the database management unit 316.

In Step S803, the noise generation unit 315 generates noise data by acquiring noise data corresponding to a driving situation instructed in Step S802 from a noise table.

In Step S804, the superimposition unit 312 superimposes the registered voice data acquired in Step S801 on the noise data generated in Step S803 to generate superimposed registered voice data. By the above, noise data corresponding to a driving situation is added to registered voice data.

In Step S805, the feature amount calculation unit 313 calculates a second feature amount that is a feature amount of the superimposed registered voice data.

In Step S806, the database management unit 316 generates, in the second feature amount calculated in Step S805, a feature amount data set including the driving situation instructed in Step S802 and a speaker ID and a command ID corresponding to the second feature amount.

In Step S807, the database management unit 316 stores a feature amount data set in the feature amount database 20.

In Step S808, the driving situation instruction unit 314 determines whether or not instruction for all driving situations is completed. In a case where instruction for all driving situations is completed (YES in Step S808), the processing proceeds to Step S809. On the other hand, in a case where instruction for all driving situations is not completed (NO in Step S808), the driving situation instruction unit 314 returns the processing to Step S802 and instructs a next driving situation. By the above, processing of Steps S802 to S807 is executed for a next driving situation.

In Step S809, the registered voice data acquisition unit 311 determines whether or not registration work for all registration commands is completed. In a case where all registration work is completed (YES in Step S809), the processing ends. On the other hand, in a case where all registration works is not completed (NO in Step S809), the registered voice data acquisition unit 311 returns the processing to Step S801. By the above, the registered voice data acquisition unit 311 prompts a speaker to utter a next registration command, and acquires registered voice data for a next registration command. After the above, the processing of Steps S801 to S807 is executed for registered voice data for a next registration command.

As described above, according to the present embodiment, the feature amount database 20 used when the voice recognition device 1 and 1A extract a second feature amount corresponding to a driving situation can be generated.

A variation below can be employed for the present disclosure.

(1) In a case where the voice recognition devices 1 and 1A are applied to a household electric appliance that is an apparatus other than the mobile objects 100 and 100A, a driving situation is, for example, an operation mode of the household electric appliance, and operation information is noise data or operation data. The operation mode is, for example, a cooling mode, a heating mode, or the like in a case of an air conditioner, and is washing, rinsing, spin drying, drying, or the like in a case of a washing machine. The noise data is sound data of an environmental sound including noise data and the like generated from a household electric appliance. The operation data is, for example, a rotation speed of a motor, power consumption of a motor, voltage of a motor, current of a motor, air temperature, set temperature, and the like in a case of an air conditioner, and is a rotation speed of a motor, power consumption of a motor, voltage of a motor, current of a motor, a water level, and the like in a case of a washing machine. In this variation, commands are various commands for operating a household electric appliance such as starting operation.

(2) In a case where the voice recognition devices 1 and 1A are applied to a manufacturing device that is an apparatus other than the mobile objects 100 and 100A, for example, a situation of a manufacturing line is employed as a driving situation. Situations of a manufacturing line include a situation in which the manufacturing line is stopped, a situation in which the manufacturing line is operating at a normal production amount, a situation in which the manufacturing line is operating at a production amount larger than a normal production amount, a situation in which the manufacturing line is operating at a production amount smaller than a normal production amount, and the like. In this variation, the operation information is noise data or operation data of a manufacturing device. The operation data is sensing data of a sensor provided in a manufacturing device. In this variation, as a command, for example, an inspection result for a plurality of inspection items input at the time of inspection of a manufacturing device is employed. For example, OK for a first inspection item, NG for a second inspection item, and the like are examples of the command.

(3) In the second embodiment, the estimation unit 14A estimates a driving situation of the mobile object 100A based on travel data and environment data, but may estimate a driving situation without using the environment data.

(4) For example, in a case where a speaker is determined in advance, speaker identification is not necessary, and thus the voice recognition devices 1 and 1A do not need to include the speaker identification unit 18.

INDUSTRIAL APPLICABILITY

The present disclosure is useful in a technical field where an input command of an apparatus such as a mobile object is input by voice.

The invention claimed is:

1. A voice recognition device that recognizes a command of a mobile object by voice, the voice recognition device comprising:
a processor that:
acquires input voice data of an input command uttered by a speaker;
calculates a first feature amount that is a feature amount of the input voice data;
acquires traveling noise data, the traveling noise data being data indicating an environmental sound acquired by a microphone under a situation where the speaker is not uttering; and
estimates a driving situation of the mobile object based on the acquired traveling noise data; and
a feature amount database that stores a plurality of second feature amounts that are feature amounts of superimposed registered voice data in which noise data indicating a noise sound of the mobile object according to a plurality of driving situations is superimposed on each piece of registered voice data of a plurality of registration commands uttered by the speaker in advance,
wherein the processor further:
identifies the speaker who utters the input command;
extracts one or more second feature amounts corresponding to the identified speaker and the estimated driving situation from the feature amount database;
recognizes the input command based on similarity between the first feature amount and the one or more extracted second feature amounts; and
outputs a recognition result.

2. The voice recognition device according to claim 1, wherein
the driving situation includes at least one of situations of slow driving, city driving, and high speed driving.

3. The voice recognition device according to claim 1, wherein
the processor uses a trained model obtained by machine learning using the traveling noise data and the driving situation according to the traveling noise data as learning data to estimate the driving situation.

4. The voice recognition device according to claim 1, wherein
noise data superimposed on the registered voice data is generated by a noise generator that generates the noise data according to the driving situation.

5. The voice recognition device according to claim 1, wherein
the processor recognizes, as the input command, a registration command corresponding to a second feature amount having highest similarity to the first feature amount among the one or more extracted second feature amounts.

6. The voice recognition device according to claim 1, wherein
the first feature amount and the second feature amount are vectors, and the similarity is calculated based on a distance between vectors of the first feature amount and the extracted one or more second feature amounts.

7. A voice recognition method in a voice recognition device that recognizes a command of a mobile object by voice, the voice recognition method comprising:

acquiring input voice data of an input command uttered by a speaker;

calculating a first feature amount that is a feature amount of the input voice data;

acquiring traveling noise data, the traveling noise data being data indicating an environmental sound acquired by a microphone under a situation where the speaker is not uttering;

estimating a driving situation of the mobile object based on the acquired traveling noise data;

identifying the speaker who utters the input command;

extracting one or more second feature amounts corresponding to the identified speaker and the estimated driving situation from a feature amount database, the feature amount database storing a plurality of second feature amounts that are feature amounts of superimposed registered voice data in which noise data indicating a noise sound of the mobile object according to a plurality of driving situations is superimposed on each piece of registered voice data of a plurality of registration commands uttered by the speaker in advance;

recognizing the input command based on similarity between the first feature amount and the one or more extracted second feature amounts; and outputting a recognition result.

8. A non-transitory computer readable recording medium storing a voice recognition program for causing a computer to function as a voice recognition device that recognizes a command of a mobile object by voice, the voice recognition program causing a processor of the voice recognition device to execute processing of:

acquiring input voice data of an input command uttered by a speaker;

calculating a first feature amount that is a feature amount of the input voice data;

acquiring traveling noise data, the traveling noise data being data indicating an environmental sound acquired by a microphone under a situation where the speaker is not uttering;

estimating a driving situation of the mobile object based on the acquired traveling noise data;

identifying the speaker who utters the input command;

extracting one or more second feature amounts corresponding to the identified speaker and the estimated driving situation from a feature amount database, the feature amount database storing a plurality of second feature amounts that are feature amounts of superimposed registered voice data in which noise data indicating a noise sound of the mobile object according to a plurality of driving situations is superimposed on each piece of registered voice data of a plurality of registration commands uttered by the speaker in advance;

recognizing the input command based on similarity between the first feature amount and the one or more extracted second feature amounts; and outputting a recognition result.

* * * * *